2,780,582
CHEMICAL REFINING AND CATALYTIC CONVERSION OF HYDROCARBON OILS

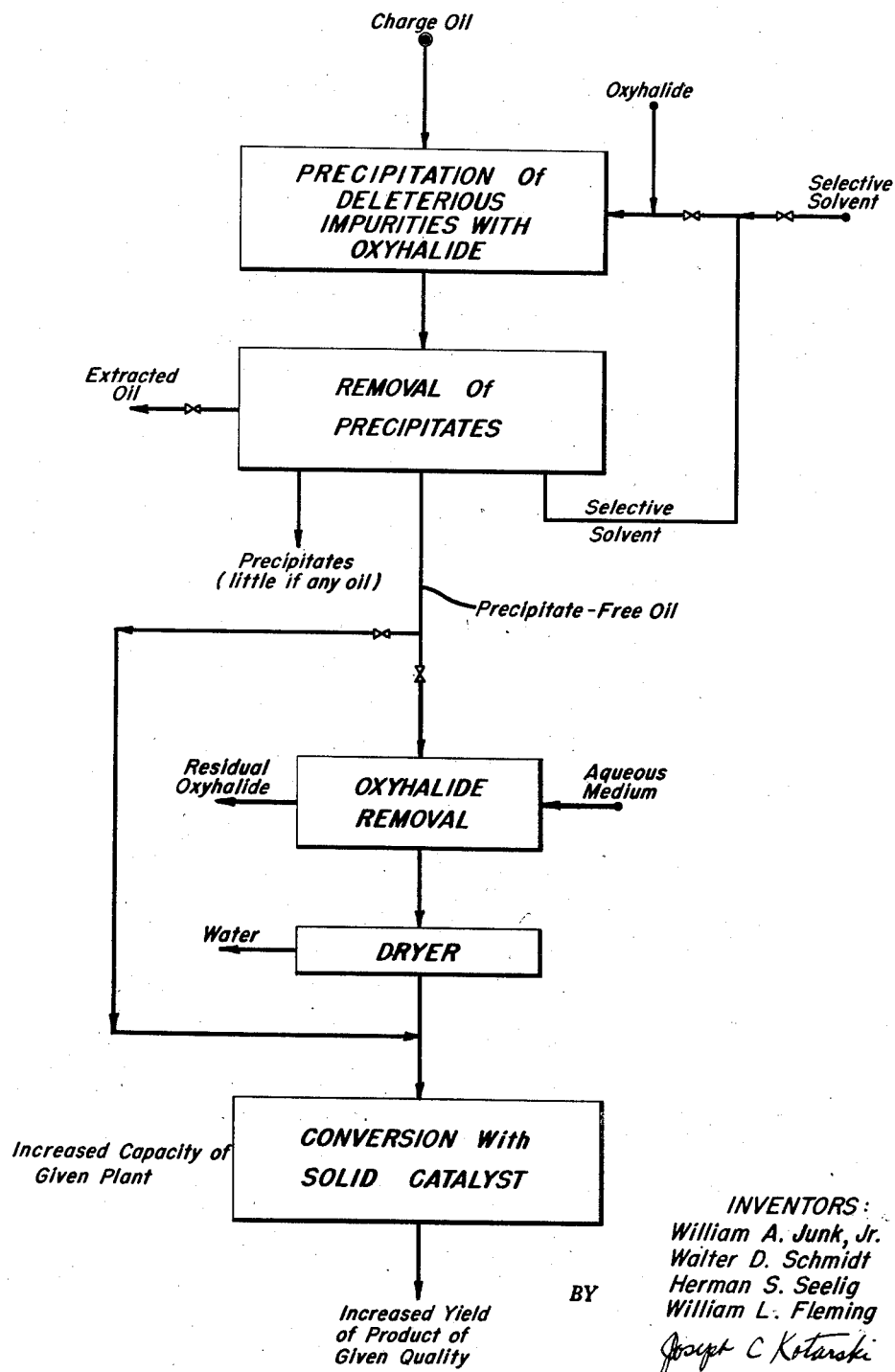

William A. Junk, Jr., Chicago, Ill., Walter D. Schmidt, Emerson, N. J., and Herman S. Seelig, Valparaiso, and William L. Fleming, Hammond, Ind., assignors to Standard Oil Company, Chicago, Ill., a corporation of Indiana Application July 29, 1954, Serial No. 446,611

7 Claims. (Cl. 196—23)

This invention relates to the catalytic conversion of pretreated hydrocarbon oil charging stocks and it pertains more particularly to a combination pretreating-catalytic conversion process wherein the pretreating of the hydrocarbon oil charging stock results in its increased conversion to more desirable products in the catalytic conversion process.

It is known that hydrocarbon oil charging stocks to catalytic conversion processes such as catalytic cracking, catalytic reforming, catalytic isomerization and the like, contain materials which adversely affect the catalytic conversion of such oils over solid type catalysts. This results in decreased conversion of the charging stock, lower yields of the desired product, higher yields of undesired product, or combinations thereof. For example, the prior art recognizes that catalytic cracking charging stocks containing significant quantities of asphaltenes, condensed polynuclear hydrocarbons, sulfur compounds, nitrogen compounds, or metals, are inferior charging stocks to a catalytic cracking process because the rate of conversion of the charging stock to desirable lower boiling products, particularly motor fuel, is less than would be obtained from a charging stock free of these undesirable impurities. In addition, an increased rate of coke deposition on the catalyst is observed and the accumulative effect of these impurities may require that the catalyst be discarded sooner. An object of this invention is to provide an improved method and means for pretreating hydrocarbon oil charging stocks to remove therefrom materials which adversely affect the catalytic conversion of said charging stocks over catalysts of the solid type, which method and means is particularly effective on catalytic cracking charge stocks and catalytic reforming charge stocks. Another object of this invention is to increase the effectiveness of solvent extraction processes for preparing feed stocks to catalytic conversion processes. A further object is to increase the effective capacity of catalytic conversion systems such as catalytic cracking and to obtain increased yields of the higher quality products and lower yields of undesirable products from a given amount of charging stock at minimum overall expense. Other objects will become apparent in the course of the detailed description of the invention.

In practicing the invention, a hydrocarbon oil charging stock to a catalytic conversion process such as catalytic cracking, catalytic reforming, or the like is contacted with an oxyhalide of sulfur or phosphorus to form precipitates of deleterious impurities in the charging stock which impurities adversely affect the catalytic conversion of the charging stock. The dark sludgy precipitates may be removed from the oil by settling and/or filtering but are preferably removed by solvent extracting, and the treated oil is then contacted with a hydrocarbon conversion catalyst of the solid type such as silica-alumina, molybdena-alumina, platinum-alumina, or the like under conditions to effect catalytic conversion of the treated oil.

When catalytic conversion charging stocks are pretreated in the above manner, a remarkable improvement is obtained in the catalytic conversion step. For example, if a gas oil charging stock to catalytic cracking is pretreated in accord with our invention, the following advantages are obtained: (1) an increased rate of conversion of charging stock to lower boiling products, (2) an increased percentage of charging stock converted to motor fuel, and (3) a decrease in the percentage of charging stock converted to coke when operating at a given conversion level, thereby increasing the allowable throughput of charging stock to the catalytic cracking unit and increasing its effective capacity by a substantial amount to produce motor fuel.

The charging stocks which may be pretreated are those hydrocarbon oils boiling in the naphtha through gas oil range, i. e. 80 to 900° F. The oil may be a virgin distillate or a distillate from a catalytic or thermal conversion process, the pretreating being particularly beneficial when applied to virgin distillates and distillates from thermal conversion processes such as coke still distillates, especially those having higher end boiling points, e. g. 800° F.

The oxyhalide may be one such as $SOCl_2$, $SO_2Cl_2$, $SO_2Br_2$, $POCl_3$, $POBr_3$, and the like. It is employed in a small but sufficient quantity to form detectable dark sludgy precipitates of impurities contained in the charging stock. The amount used will vary with the amount of deleterious materials contained in the charging stock and is usually less than about 1% by weight based on charging stock; beneficial results being obtainable with amounts as low as 0.005% by weight. While we do not wish to be bound by any theory we feel that at least some of the impurities which are removed in the pretreating process consist of nitrogen compounds. As a guide, approximately 0.05 to 0.5 mol of oxyhalide may be used per gram atom of nitrogen contained in the charging stock. The charging stock and the oxyhalide are contacted and agitated at a temperature below about 300° C., preferably at ordinary atmospheric temperatures to form detectable amounts of dark sludgy precipitates. The precipitates may then be removed from a treated oil by filtering through a suitable material such as clay or the like, or by settling. Since the precipitates tend to remain suspended in the oil, settling the mixture for a practicable period of time will remove only a portion of the precipitates and this technique is not preferred since prolonged settling periods of 6 to 24 hours would be required for substantial removal of the precipitates. Our preferred method of removing the precipitates comprises contacting the mixture of oil and precipitates with a selective solvent of the type ordinarily employed for removing cyclic hydrocarbons from petroleum fractions, e. g. liquid $SO_2$, phenol, and the like under conditions to form separate extract and raffinate phases. The precipitates are contained in the extract phase and the raffinate phase contains the treated oil which is recovered therefrom and passed to the catalytic conversion step. When any residual amount of oxyhalide remains in the precipitate-free treated oil, because of the use of an excess amount of oxyhalide, it may be removed by washing the precipitate-free treated oil with about ¼ to 2 volumes of water prior to the catalytic conversion of the treated oil.

We have further discovered that if our pretreating process with the oxyhalide of sulfur or phosphorous is conducted in the presence of a selective solvent under conditions to cause the formation of separate extract and raffinate phases, the dark sludgy precipitates will be contained in the extract phase and a treated oil of greatly improved susceptibility to catalytic conversion may then be recovered from the raffinate phase. The quality of this treated oil as a charging stock to a catalytic conversion process is superior to the quality of a charging stock obtained by preheating with the oxyhalide of sulfur or phosphorus or which is obtained by selective extraction with the same selective solvent, and it is surprisingly superior to the oil obtained by treating the charging stock in accordance with either process in sequence. This is a preferred method of pretreating catalytic cracking charging stocks, particularly virgin gas oils or thermally cracked gas oils such as coke-still gas oil. The solvents which may be employed are those having a preferential selectivity for cyclic hydrocarbons such as are useful in gas oil or lubricating oil extraction, provided that the solvent employed is one which will not be affected by the oxyhalide. Examples of such selective solvents include liquid $SO_2$, phenol, alcohol ethers such as methyl cellosolve and methyl carbitol, dimethyl formamide, dimethy sulfolane and the like. Ordinarily about 2 to 20% of the hydrocarbon oil charging stock is removed in the extract phase, but we prefer to conduct the pretreatment in the presence of the selective solvent so as to produce an extract phase containing a minimum amount of the hydrocarbon oil. This may be achieved by employing only about that amount of solvent necessary to form distinct extract and raffinate phases, and this amount is considerably less than the amount required in lubricating oil extraction. More solvent may be employed if it is desired to remove polynuclear hydrocarbons to a greater extent, but the overall results produced will generally not be as good. The extracted oil may be useful as a plasticizer, fuel oil, or for other purposes.

The oxyhalide may be introduced directly into the solvent extraction zone, or it may be introduced along with the oil into the extractor. We prefer to add the oxyhalide to the selective solvent prior to entry of the latter into the solvent extraction zone. The oxyhalide is effective under the operating conditions ordinarily employed in the solvent extraction of stocks such as gas oils or lubricating oils so that treating conditions differing from the conventional are ordinarily not required. The treated oil is recovered from the raffinate phase, freed of residual solvent and oxyhalide, and is then catalytically cracked over a conventional cracking catalyst such as silica-alumina, silica-magnesia, clay, or the like. By our combination process of solvent extracting the catalytic cracking charging stock in the presence of the oxyhalide and then catalytically cracking the treated oil, a considerable improvement is obtained in the rate of conversion to lower boiling products with increased yields of motor fuel and decreased conversion of charge stock to coke over that obtained by pretreating the charging stock with the oxyhalide or by solvent extracting the charging stock in the absence of the oxyhalide, or by treating with both pretreating processes in sequence.

By employing our invention it is possible to reduce by a very substantial amount the capital investment required for catalytic cracking facilities. The regenerator section of such facilities, and in particular the air compressor units, are a very costly portion of the catalytic cracking facilities. Because of the great reduction in coke formation, the increase in conversion of the charging stock to lower boiling products, and the increased percentage of treated charging stock converted to motor fuel, it is possible to design new catalytic cracking facilities to process a given amount of gas oil using regenerator units of about one-half the size that would be required if the gas oil were not pretreated. The reactor size may also be reduced. After allowing for the investment cost of the pretreating facilities, a very substantial savings in investment costs can be realized. If other equipment limitations such as the heating capacity, distillation capacity, and the like in present day operating catalytic cracking facilities are not limiting, the use of our invention may enable the throughput to existing reactor units and the gasoline produced to be increased by as much as 100% or more while using the same regeneration facilities and perhaps, even reducing the size of the regeneration facilities. The tremendous savings in operating costs are apparent.

The invention is illustrated by the following examples and data wherein a coke still gas oil (feed A) obtained from the coking of a mixture of reduced crudes primarily of West Texas origin and a blend (feed B) of 74% of this coke still gas oil and 26% virgin paraffin distillate were pretreated in accordance with our invention and then catalytically cracked over a silica-alumina catalyst to produce motor fuel as the desired product.

The experimental procedure which was followed when pretreating with only the oxyhalide consisted of placing about 1200 cc. (1057 grams) of the gas oil in a large separatory funnel at room temperature, adding 3.1 grams of sulfuryl chloride and shaking for about five minutes. Thet reatment caused a darkening of the oil due to the formation of precipitates of the deleterious impurities contained in the oil. The mixture of oil and precipitates was allowed to stand overnight to settle the precipitates. The treated oil was decanted and then passed through filter paper to remove additional amounts of precipitates. The treated oil was then washed twice with about 500 cc. of water to remove remaining traces of sulfuryl chloride. Water had become occluded in the treated oil during the water washes, was removed from the treated oil by passing the latter through filter paper, and the treated oil was then catalytically cracked over a silica-alumina catalyst.

The experimental procedure which was followed when the gas oil was solvent extracted with either dimethyl formamide, dimethyl sulfolane, methyl cellosolve, diacetone alcohol, tetrahydrofurfuryl alcohol, phenol, esters of thiosulfonic acid, or methanol in the presence and in the absence of the oxyhalide consisted of adding the particular selective solvent in an amount between 150 to 400 cc. and containing from 1.5 to 6.2 grams of the oxyhalide (if the latter was to be used in the particular experiment) to 1100 to 1600 cc. (990 to 1437 grams) of the gas oil which was contained in a separatory funnel at about room temperature. The mixture of gas oil, selective solvent, and oxyhalide was shaken for about five minutes and then allowed to stand for at least about fifteen minutes to form distinct extract and raffinate phases. The extract phase containing the precipitates of the impurities contained in the feed gas oil was darker in color than the raffinate phase. The extract phase was withdrawn and the raffinate phase was washed twice with about 50 volume percent of water based on raffinate oil to remove any residual solvent and sulfuryl chloride from the oil. The treated oil from the raffinate phase was passed through filter paper to remove water and it was then catalytically cracked over silica-alumina catalyst. Inspections of the treated oil will vary to some extent dependent upon the particular selective solvent, the particular oxyhalide, and the conditions under which the pretreatment is performed. Inspections of a coke still gas oil (feed A) having an initial boiling point of 388° F. and a 90% point of 760° F. before and after solvent extracting 1600 cc. (1437 grams) of the oil at room temperature in one stage with 400 cc. of dimethyl sulfolane containing 4.0 grams of sulfuryl chloride according to the method described above are as follows:

INSPECTIONS OF COKE STILL GAS OIL (FEED A)

| | Gas Oil Charge | Treated Oil |
|---|---|---|
| API Gravity | 26.0 | 30.1 |
| Rnlline Point, °F | 149.9 | 162.3 |
| Sefractive Index $\eta D^{20}$ | 1.5031 | 1.4920 |
| Aulfur, Weight Percent | 2.19 | 1.79 |
| Nitrogen, Weight Percent | 0.098 | 0.04 |
| Micro Dye Analysis, Vol. Percent: | | |
| Paraffins and Naphthenes | 53.5 | 55.0 |
| Olefins | 6.0 | 4.0 |
| Aromatics | 40.5 | 41.0 |
| Oil Extracted by Treatment, Volume Percent | | 16.4 |

When liquid $SO_2$ was employed as the selective solvent in experiments where sulfuryl chloride was employed and in the experiments where sulfuryl chloride was not employed, the experimental procedure consisted of adding 4.15 grams of sulfuryl chloride (if the latter was to be used in the particular experiment) to about 1600 cc. (1408 grams) of oil which was contained in a stirred autoclave maintained at room temperature. Approximately 500 cc. of liquid $SO_2$ at $-20°$ C. was added to the oil and the mixture of oil, liquid $SO_2$, and sulfuryl chloride was shaken until an equilibrium pressure of about 50 p. s. i. a. was reached therein. The extract and raffinate phases were then separated and the $SO_2$ released from the separate phases. Residual amounts of $SO_2$ and sulfuryl chloride were removed from the treated oil recovered from the raffinate phase by washing the treated oil with about 400 cc. of 10% sodium hydroxide solution and then with water until the wash waters were neutral to litmus paper. The treated and washed oil was then dried by passage through filter paper, and the oil was then catalytically cracked over silica-alumina catalyst. Inspections of the blend of gas oils (feed B) which had an initial boiling point of 366° F. and a 90% point of 736° F. before and after solvent extracting with liquid $SO_2$ and sulfuryl chloride in the manner described above are as follows:

INSPECTIONS

|  | Gas Oil Charge | Treated Oil |
|---|---|---|
| API Gravity | 29.2 | 29.1 |
| Aniline Point, ° F | 69.1 | 70.1 |
| Refractive Index $\eta D^{26}$ | 1.4292 | 1.4913 |
| Sulfur, Weight Percent | 1.47 | 1.46 |
| Micro Dye Analysis, Vol. Percent: | | |
| Paraffins and Naphthenes | 59.0 | 58.0 |
| Olefins | 7.0 | 6.5 |
| Aromatics | 34.0 | 35.5 |
| Oil Extracted by Treatment, Volume Percent | | 2 |

A number of samples of both the coke still gas oil (feed A) and the gas oil blend (feed B) were treated with sulfuryl chloride, and by solvent extracting the oil in the absence of sulfuryl chloride, and by solvent extracting the oil in the presence of sulfuryl chloride, the pretreatment being performed under comparable conditions and according to the procedure described above. A number of selective solvents were employed both with and without sulfuryl chloride in this manner. Each untreated and treated oil sample was divided into two portions and each portion was catalytically cracked in a laboratory scale fixed bed catalytic cracking unit containing ground silica-alumina catalyst and operating at a block temperature of 930° F. The two portions of each sample were catalytically cracked under substantially the same conditions of temperature, catalyst activity, etc. but employing different contact times, i. e. 30 minutes and 60 minutes in order to obtain data on the percentage of charging stock converted to lower boiling products, the percentage of charging stock converted to motor fuel, and the percentage of charging stock converted to coke for each sample at the two different space velocities employed. These data for each sample were plotted on log paper, plotting reciprocal space velocity as the abscissa and percentage conversion of charging stock to lower boiling products, percentage of charging stock converted to motor fuel, and percentage of charging stock converted to coke as the ordinate. The percent conversion, percent conversion to motor fuel, and the coke yield vary in approximately a straight line function with reciprocal space velocity when so plotted on log paper, and therefore, a straight line may be drawn between the data points obtained when the two portions of the same sample were catalytically cracked at different space velocities. With the lines drawn it is possible to interpolate to obtain comparisons as to catalytic cracking results on the untreated and treated samples at either the same percentage conversion of charging stock to lower boiling products or at the same reciprocal space velocity.

The data presented in Table I which follows are interpolated data which were obtained in the above-described method. These data are interpolated to the same or comparable percent conversions of gas oil feed to lower boiling products. Comparisons of the effect of the various pretreating processes on the percent of feed converted to motor fuel and coke are particularly significant when presented on this basis because it demonstrates most clearly the effect of the pretreating process for improving the selectivity of catalytic cracking to produce increased amounts of motor fuel and lesser amounts of coke.

Table I

| Run No. | Oil Feed | Solvent | Vol. Solvent/Vol. Oil | Weight Percent Sulfuryl Chloride on Feed | Conversion, Wt. Percent | Reciprocal Space Velocity (Wc/Wo/Hr.) | Motor Fuel ($C_5$—400° F.), Wt. Percent | Coke Wt. Percent | Cracking Throughput Attainable [1] |
|---|---|---|---|---|---|---|---|---|---|
| 1 | B | | | | 43.0 | 0.370 | 27.4 | 3.23 | 1.0 |
| 2 | B | | | 0.29 | 43.0 | 0.295 | 26.4 | 2.60 | 1.24 |
| 3 | B | Dimethyl Formamide | 0.25 | | 43.0 | 0.300 | 28.3 | 2.07 | 1.56 |
| 4 | B | do | 0.25 | 0.15 | 43.0 | 0.220 | 28.9 | 1.70 | 1.90 |
| 5 | B | do | 0.25 | .29 | 43.0 | 0.220 | 28.9 | 1.70 | 1.90 |
| 6 | B | do | 0.25 | .59 | 43.0 | 0.220 | 28.9 | 1.70 | 1.90 |
| 7 | B | Dimethyl Sulfolane | 0.25 | | 43.0 | 0.277 | 28.2 | 1.87 | 1.73 |
| 8 | B | do | 0.25 | 0.29 | 43.0 | 0.172 | 29.0 | 1.05 | 3.08 |
| 9 | B | Methyl Cellosolve | 0.25 | | 43.0 | 0.322 | 27.2 | 2.45 | 1.32 |
| 10 | B | do | 0.25 | 0.29 | 43.0 | 0.225 | 28.0 | 1.87 | 1.73 |
| 11 | B | | | | 36.0 | 0.245 | 24.3 | 2.41 | 1.0 |
| 12 | B | $SO_2$ | 0.31 | | 36.0 | 0.197 | 24.7 | 1.93 | 1.25 |
| 13 | B | $SO_2$ | 0.31 | 0.29 | 36.0 | 0.164 | 25.9 | 1.68 | 1.43 |
| 14 | A | | | | 41.5 | 0.360 | 24.0 | 4.10 | 1.00 |
| 15 | A | Dimethyl Formamide | [2] 0.31 | | 41.5 | 0.310 | 25.4 | 3.00 | 1.37 |
| 16 | A | do | [3] 0.22 | 0.60 | 41.5 | 0.191 | 27.9 | 2.04 | 2.01 |
| 17 | A | | | | 42.5 | 0.362 | 24.3 | 4.28 | 1.0 |
| 18 | A | Dimethyl Sulfolane | 0.25 | | 42.5 | 0.275 | 26.6 | 2.50 | 1.71 |
| 19 | A | do | 0.25 | 0.28 | 42.5 | 0.174 | 28.9 | 1.90 | 2.25 |

[1] The volume of oil which could be charged to a catalytic cracking unit operating at a constant conversion and at the same total amount of coke formed on catalyst. Obtained by dividing wt. percent coke formed with untreated feed by wt. percent coke formed with treated feed.
[2] Three stage extraction using 43% of the total amount of solvent in the first stage and 28.5% in the second and third stages.
[3] Two stage extraction using 61% of the total amount of solvent in the first stage and 39% in the second stage.

The data in Table I demonstrate the effectiveness of pretreating a catalytic cracking charging stock with sulfuryl chloride to reduce the conversion of charging stock to coke; see for example, runs 1 through 4. It will also be noted that the percentage of conversion of charging stock to lower boiling products was achieved at a lower reciprocal space velocity (equivalent to a higher space velocity). Thus, if one employs the same capacity of air compressors etc. to burn coke from the catalyst, the pretreating of the charging stock with sulfuryl chloride will enable throughput to the catalytic cracking unit to be increased, since less of the charging stock is converted to coke. If operating at a constant capacity to burn coke, and it is assumed that the throughput to the catalytic cracking unit with an untreated charging stock is 1.0, then treatment of the charging stock with 0.29 weight percent of sulfuryl chloride will enable the throughput to the catalytic cracking unit to be increased to 1.24, a gain of 24%, while operating at the same rate of conversion. Runs 4, 5, and 6 demonstrate that 0.15% by weight of sulfuryl chloride or less is enough, and that there is no apparent improvement in employing more sulfuryl chloride in connection with this particular charging stock. The use of dimethylsulfolane containing sulfuryl chloride (run 19) for extracting the charging stock improves the quality of the charging stock to such a remarkable extent that when operating at a fixed level of conversion (42.5%) to lower boiling products, the throughput to the catalytic cracking unit can be increased by approximately 115% while producing 4.6% more gasoline from the charge to the cracking unit and operating at a lower coke burning capacity. An unexpected result is that the percentage of charging stock converted to motor fuel is increased when the charging stock is solvent extracted in the presence of sulfuryl chloride. This is particularly surprising because pretreating the charging stock with sulfuryl chloride alone reduces by a minor amount the percentage of charging stock converted to motor fuel.

Data are presented below in Table II to show that at the same space velocity, pretreatment of the charging stock with oxyhalide will result in an increased conversion of the charging stock to lower boiling products, an increased conversion of charging stock to motor fuel, and often a decreased percentage of charging stock converted to coke. The data in Table II clearly demonstrate that the treated oil is more easily cracked. These data in Table II were obtained by interpolating to the same reciprocal space velocity from actual data plotted on log paper as has been described previously.

improvement is noted in connection with the coke still gas oil feed (feed A) wherein the charging stock was solvent extracted with dimethyl sulfolane in the presence of 0.28 weight percent sulfuryl chloride. Runs 14 and 18 show that such treatment resulted in an increase in motor fuel production from 22.5% to 30.4% of the oil charged to the catalytic cracking unit. This is equivalent to an increase in motor fuel production of 35% when the catalytic cracking unit is operated at the same conditions for cracking treated and untreated oil. If the percentage of motor fuel produced is based on the original charging stock to the pretreating zones, and consideration is thus given to the amount of oil extracted during the pretreating operation, then at the same space velocity the percentage of original charging stock converted to motor fuel is 22.5% for the untreated oil, 22.8% for the oil which was solvent extracted with dimethyl sulfolane, and 26.6% for the oil which was solvent extracted with dimethyl sulfolane in the presence of the sulfuryl chloride. Although solvent extraction with dimethyl sulfolane alone resulted in a negligible increase in gasoline production based on original charging stock, the same pretreatment in the presence of 0.29% sulfuryl chloride produced 18% more motor fuel. In addition, an extracted oil which is suitable for use as fuel or for other purposes is produced. Additional experiments were performed which show that solvent extraction of the charging stock using varying amounts of selective solvent, but in the absence of sulfuryl chloride was not capable of improving the quality of the charging stock to the extent obtained by solvent extraction in the presence of the sulfuryl chloride with about the minimum of selective solvent necessary to produce extract and raffinate phases.

To determine the effectiveness of various methods of pretreating the gas oil charge stock prior to catalytic cracking, a number of pretreating experiments were performed and the treated gas oil was then catalytically cracked. The following pretreating experiments were performed: (1) pretreatment with sulfuryl chloride, (2)

*Table II*

| Run No. | Oil Feed | | Vol. Solvent/Vol. Oil | Wt. Percent Sulfuryl Chloride on Feed | Reciprocal Space Velocity (Wc/Wo/Hr.) | Conversion, Wt. Percent | Motor Fuel ($C_5$–400° F.), Wt. Percent |
|---|---|---|---|---|---|---|---|
| 1 | B | | | | 0.370 | 43.0 | 27.4 |
| 2 | B | | | 0.29 | 0.370 | 49.9 | 29.3 |
| 3 | B | Dimethyl Formamide | 0.25 | | 0.370 | 48.8 | 29.8 |
| 4 | B | do | 0.25 | 0.15 | 0.370 | 53.0 | 31.7 |
| 5 | B | do | 0.25 | 0.29 | 0.370 | 53.0 | 31.7 |
| 6 | B | do | 0.25 | 0.59 | 0.370 | 53.0 | 31.7 |
| 7 | B | Dimethyl Sulfolane | 0.25 | | 0.370 | 50.5 | 30.1 |
| 8 | B | do | 0.25 | 0.29 | 0.370 | 54.9 | 32.5 |
| 9 | B | Methyl Cellosolve | 0.25 | | 0.370 | 46.9 | 28.1 |
| 10 | B | do | 0.25 | 0.29 | 0.370 | 52.1 | 31.1 |
| 11 | B | | | | 0.245 | 36.0 | 24.3 |
| 12 | B | $SO_2$ | 0.31 | | 0.245 | 40.0 | 27.0 |
| 13 | B | $SO_2$ | 0.31 | 0.29 | 0.245 | 42.7 | 29.3 |
| 14 | A | | | | 0.245 | 33.3 | 22.5 |
| 15 | A | Dimethyl Formamide | [1] 0.31 | | 0.244 | 36.5 | 24.8 |
| 16 | A | do | [2] 0.22 | 0.60 | 0.244 | 44.6 | 28.9 |
| 17 | A | Dimethyl Sulfolane | 0.25 | | 0.245 | 40.0 | 26.0 |
| 18 | A | do | 0.25 | 0.28 | 0.245 | 48.5 | 30.4 |

[1] Three stage extraction using 43% of the total amount of solvent in the first stage and 28.5% in the second and third stages.
[2] Two stage extraction using 61% of the total amount of solvent in the first stage and 39% in the second stage.

It will be noted from Table II that at the same space velocity (shown as reciprocal space velocity in Table II) the pretreated oil is cracked to a greater extent than the untreated oil and that more of the pretreated oil is converted to motor fuel than is the untreated oil. Data regarding the conversion of charging stock to coke are not comparative when presented at different percent conversions of the gas oil to lower boiling products, because at higher rates of conversion a disproportionate conversion to coke is obtained. Therefore, the data regarding coke formation are not presented in Table II but comparisons can be obtained from Table I. A most striking a two-step pretreating process consisting of pretreating the gas oil by treating with sulfuryl chloride, filtering out the dark precipitates, and then solvent extracting the sulfuryl chloride-treated oil with methanol and (3) a one-step pretreating procedure which consisted of pretreating the oil by solvent extracting it in the presence of sulfuryl chloride. In each pretreating experiment, 1200 cc. (1078 grams) of the coke still gas oil (feed A) was used. Sulfuryl chloride was employed in the amount of 1.55 grams. When the pretreating experiment involved the use of methanol it was employed in a one stage extraction in the amount of 300 cc. The experimental procedure which was followed when pretreating the oil only with sulfuryl chloride and when pretreating the oil by solvent extracting with methanol in the presence of sulfuryl chloride was the same as that previously described. The experimental procedure which was followed in the two-step pretreating process consisted of mixing 1200 cc. of the coke still gas oil (feed A) with 1.55 grams of sulfuryl chloride in a glass beaker at room temperature and agitating for about five minutes until the oil had a darkened appearance due to the presence of the dark sludgy precipitates. The mixture was then filtered through filter paper to remove these precipitates and the treated oil free of precipitates was water washed with about an equal volume of water to remove any residual amount of sulfuryl chloride. The oil was then passed through filter paper to dry it. After drying, the oil was placed in a separatory funnel and 300 cc. of methanol was added. The mixture was then shaken for about five minutes and then allowed to stand for at least about fifteen minutes to form distinct extract and raffinate phases. The raffinate phase was then withdrawn and washed with about an equal volume of water to remove methanol remaining therein. This treated oil was then passed through filter paper to remove remaining amounts of water. Samples of the untreated and treated oils obtained by the various pretreating processes described herein were catalytically cracked in a laboratory scale fixed bed catalytic cracking unit containing ground silica-alumina catalyst and operating at a block temperature of 930° F. The two portions of each sample were catalytically cracked under substantially the same conditions of temperature, catalyst activity, and the like, but employing different contact times to obtain data on the percentage of charging stock converted to lower boiling products, the percentage of charging stock converted to motor fuel, and the percentage of charging stock converted to coke for each sample. The results for each sample were plotted on log paper in the manner previously described and comparisons of the catalytic cracking results employing untreated and treated samples at the same percent conversion and at the same reciprocal space velocity were obtained. These interpolated data are presented below in Table III.

the percentage of charging stock converted to motor fuel by the percentage of charging stock converted to coke. When this is done, the factor for the untreated feed is 10.6, for the two-step pretreatment it is 13.1, whereas for the one-step pretreatment it is 17.0. When a comparison of the pretreating processes is made based upon the motor fuel produced by catalytically cracking the treated gas oil under the same severity, i. e. equal temperature, space velocity, and catalyst activity, it will be noted that the one-step pretreatment produces more gasoline from a given amount of oil charged to the catalytic cracking unit than is produced by the two-step pretreatment. These data indicate the synergistic effect of conducting the pretreating with the oxyhalide simultaneously with solvent extraction of the gas oil.

The invention is further described in relation to the annexed drawing which forms a part of the specification. This drawing shows in schematic form a process flow diagram for performing the processes of this invention.

The charge oil which may be pretreated may be one boiling in the naphtha through gas oil range. The degree of improvement in the quality of the charge oil when it is pretreated in accord with this invention is greater when pretreating petroleum fractions having higher end boiling points, e. g. 700–800° F. The process of this invention is particularly useful in pretreating those oils containing large amounts of impurities such as nitrogen compounds and the like which tend to deactivate the conversion catalyst and/or reduce the conversion of the charge oil to desired products and/or increase the conversion of charge oil to undesired products. California and West Texas origin oils are particularly bad in this respect and are greatly improved when pretreated in accord with our invention prior to their catalytic conversion. The charge oil may be a virgin distillate or one obtained from a catalytic or thermal conversion process. Pretreatment is particularly effective upon virgin charge oils and upon oils obtained from thermal conversion processes such as coke still naphtha and coke still gas oil. A preferred charge oil is a coke still gas oil such as contains a high content of nitrogen compounds and other deleterious materials.

The charge oil is admixed with an oxyhalide of sulfur

*Table III*

| Basis of Comparison | Run No. | Pretreatment | Conversion, Wt. Percent | Reciprocal Space Velocity, Wc/Wo/Hr. | Motor Fuel ($C_5$–400° F.), Wt. Percent | Coke Wt. Percent | Cracking Throughput Attainable [1] |
|---|---|---|---|---|---|---|---|
| Equal Percent Conversion | 1 | None | 40.0 | .310 | 26.2 | 2.47 | 1.0 |
| | 2 | $SO_2Cl_2$ | 40.0 | .273 | 26.4 | 2.22 | 1.11 |
| | 3 | Two Step—$SO_2Cl_2$—$CH_3OH$ | 40.0 | .256 | 26.7 | 2.04 | 1.21 |
| | 4 | One Step—$SO_2Cl_2$+$CH_3OH$ | 40.0 | .196 | 26.8 | 1.58 | 1.56 |
| Equal Space Velocity | 1 | None | 36.6 | .270 | 25.2 | | |
| | 2 | $SO_2Cl_2$ | 39.8 | .270 | 26.4 | | |
| | 3 | Two Step—$SO_2Cl_2$—$CH_3OH$ | 41.2 | .270 | 27.1 | | |
| | 4 | One Step—$SO_2Cl_2$+$CH_3OH$ | 46.5 | .270 | 29.4 | | |

[1] The volume of oil which could be charged to a catalytic cracking unit operating at a constant conversion and at the same total amount of coke formed on catalyst. Obtained by dividing wt. percent coke formed with untreated feed by wt. percent coke formed with treated feed.

Of the various pretreating processes employed upon the gas oil charging stock, it will be noted that the pretreatment by solvent extracting with methanol in the presence of the minor amount of sulfuryl chloride (run No. 4) produced the greatest improvement in the quality of the charging stock for catalytic cracking. At an equal percent conversion to lower boiling products, the one-step pretreatment of run No. 4 reduces the percentage of charging stock converted to coke by a greater amount than is obtainable by pretreating either with sulfuryl chloride, methanol extraction, or the two-step combination of sulfuryl chloride treating followed by methanol solvent extraction. On this same basis a greater percentage of the gas oil charged to the catalytic cracking unit is converted to motor fuel. A frequently used indication of the selectivity for producing motor fuel rather than coke is to divide or phosphorus. Oxyhalides such as phosphorus oxychloride and sulfuryl chloride have been found to be quite effective in precipitating the deleterious impurities contained in the charge oil. Oxyhalides such as $SOCl_2$, $SO_2Cl_2$, $SOBr_2$, $SO_2Br_2$, $SOF_2$, $SO_2F_2$, $SO_2ClF$, $S_2O_5Cl_2$, $S_2O_3Cl_4$, $POCl_3$, $POBr_3$, and the like may be used, but $SO_2Cl_2$ is preferred. The amount of oxyhalide used will depend upon the amount of deleterious impurities contained in the charge oil, but is usually less than about 1% by weight and may be as little as 0.005% by weight. This amount may readily be determined by adding oxyhalide until no further formation of dark precipitates is noted. The amount of oxyhalide to be used may be related to the nitrogen content of the oil. Approximately 0.05 to 0.5 mol of oxyhalide per gram atom of nitrogen contained in the oil, preferably about 0.1 mol of oxyhalide per gram atom of nitrogen may be used. The charge oil and the oxyhalide are agitated at a temperature below about 300° C., preferably at ordinary atmospheric temperatures to insure thorough contacting of the oxyhalide with the charge oil. A preferred method of operating consists of agitating the charge oil, preferably a coke still gas oil, at ordinary atmospheric temperatures with approximately 0.1 mol of $SO_2Cl_2$ per gram atom of nitrogen contained in the oil (usually about 0.05 to 0.2 weight percent of $SO_2Cl_2$ based on oil).

The treated oil is then freed of the dark sludge-like precipitates which were formed after introduction of the oxyhalide. The precipitates may be removed from the treated oil by filtering through such materials such as clay and the like. It has been found that the treated oil containing these precipitates may be freed of them by extracting the oil with a selective solvent such as have heretofore been used in the solvent extraction of petroleum distillates such as naphthas, kerosenes, gas oils, or lubricating oils. The precipitates will be contained in the extract phase and the precipitate-free oil in the raffinate phase. The conditions employed for extracting the precipitate-containing oil with the selective solvent may be those conditions of temperature, time of contacting, ratio of solvent to feed oil, and the like which are well known in the prior art for extracting petroleum distillates with a selective solvent. Examples of suitable selective solvents are liquid $SO_2$, phenol, cresol, methanol, B-B'-dichlorodiethyl ether (Chlorex), alcohol ethers such as methyl Cellosolve and methyl Carbitol, dimethyl formamide, dimethyl sulfolane, esters of thiosulfonic acid, tetrahydrofurfuryl alcohol, diacetone alcohol, acetonyl acetone, nitrobenzene, and the like. We prefer to operate the extraction process so as to remove a minimum quantity of oil in the extract phase. This quantity can be minimized by employing slightly more than that amount of selective solvent that is necessary to produce separate extract and raffinate phases. The amount of oil extracted will vary with the solvent employed and with the nature of the oil charged, but is generally between about 1 to 20% of the oil charge. After removing the selective solvent and the precipitates from the extracted oil, the latter may be employed as a charge stock to a thermal cracking process or may be used as fuel. When employing this technique for extracting precipitates from the treated oil, preferably a coke still gas oil, it is preferred to employ about 20 to 50 volume percent of liquid $SO_2$ and to conduct extraction at a temperature between about $-10$ and 25° C. and under sufficient pressure to maintain the $SO_2$ in the liquid phase.

A preferred form of this invention consists of contacting the oxyhalide with the charge oil in the presence of a selective solvent for the charge oil under conditions suitable for the solvent extraction of the charge oil with the particular selective solvent. Selective solvents such as have been mentioned previously for the solvent extraction of petroleum distillates such as naphthas, kerosenes, gas oils, or lubricating oils may be used provided such solvents are not affected by the oxyhalide either by way of degradation of the solvent or reaction of the solvent with oxyhalide. The presence of oxyhalide during the solvent extraction of the charge oil does not affect the operating conditions ordinarily employed for solvent extraction. Thus the conditions of temperature, time of contacting, ratio of solvent to feed oil, and the like which are well known in the prior art for extracting petroleum distillates with a selective solvent may be used. We prefer to operate the solvent extraction in the presence of the oxyhalide so as to remove a minimum quantity of oil in the extract phase. This quantity may be minimized in the manner previously related. When solvent extracting the charge oil in the presence of the oxyhalide, the oxyhalide is preferably introduced into the extraction zone by previously dissolving it within the entering selective solvent, although it may be separately introduced into the extraction zone if desired. The precipitates which are formed are contained in the extract phase and the raffinate phase contains a precipitate-free oil. The extract phase containing extracted oil and precipitate may be separated into its components in the manner previously related. We prefer to use this simultaneous oxyhalide treatment and solvent extraction when pretreating catalytic cracking charge oils. When operating in this preferred manner, a charge oil such as coke still gas oil is solvent extracted preferably with 20 to 50 volume percent of liquid $SO_2$ containing from about 0.1 to 0.5% by weight of $SO_2Cl_2$ (the $SO_2Cl_2$ may be formed by introducing $Cl_2$ into the liquid $SO_2$) and conducting the extraction at a temperature of $-10$ to 25° C. and under sufficient pressure to maintain the $SO_2$ in the liquid phase.

The precipitate-free oil may then be washed with an aqueous medium such as water or an alkaline solution to free the oil of residual amounts of the oxyhalide. An aqueous caustic solution containing about 10% of NaOH is a suitable alkaline aqueous medium. Water which has become occluded within the oil is then removed therefrom in a drying operation such as by passage through rock salt or through other dessicating mediums. If desired, the steps of washing the precipitate-free oil with the aqueous medium to remove oxyhalide followed by drying the oil may be eliminated and the precipitate-free oil sent directly to the catalytic conversion process. We prefer, however, to wash the treated precipitate-free oil followed if desired by drying before catalytically converting the treated oil.

Following this series of operations the treated oil is then contacted with a solid catalyst under conditions to effect its conversion. The conversion may be one such as catalytic cracking, catalytic reforming, catalytic hydroforming, catalytic hydrogenation, or the like. We prefer to operate the process of this invention by pretreating stocks such as gas oils prior to catalytically cracking them to produce motor fuel. The conditions used in the catalytic conversion of the oil may be approximately within the range as would be used for the non-treated charge oil, although higher rates of throughput are attainable. The conditions customarily employed in catalytic cracking are a catalyst to oil ratio in the range of 2:1 to 20:1 on a weight basis, a cracking temperature of 800 to 1000° F., e. g. 925° F., a weight space velocity in the range of 0.2 to 10 pounds of oil charged per hour per pound of catalyst in the reactor. The cracking system may be of the fluidized catalyst type or the fixed or moving catalyst bed systems. Thus the capacity of a given plant may be greatly increased. The quality of the charge oil after treatment is so increased that improved yields of desired product of a given quality are attainable.

It is apparent that many wide embodiments of this invention may be made without departing from the spirit and scope thereof and, therefore, it is not to be limited except as indicated in the appended claims.

What we claim is:

1. In a process for the catalytic conversion of petroleum distillates boiling in the naphtha through gas oil range and containing organic nitrogen compounds deleterious to the catalytic conversion of said distillates over solid catalysts, the improvement which comprises pretreating said distillates with at least one oxyhalide of an element selected from the class consisting of sulfur and phosphorous by contacting the distillate at a temperature below about 300° C. with between about 0.005 and 0.2% by weight of the oxyhalide and thereby forming precipitates of organic nitrogen compounds, the amount of oxyhalide being correlated with the amount of nitrogen in the distillate so that between about 0.05 and 0.5 gram mol of oxyhalide are employed per gram atom of nitrogen in the distillate, and removing precipitates from the treated distillate prior to the catalytic conversion of said treated distillate over said solid catalyst.

2. A catalytic cracking process employing a gas oil charging stock which contains organic nitrogen compounds deleterious to the catalytic cracking of said gas oil over a solid catalyst which process comprises contacting said gas oil at a temperature not substantially above atmospheric temperatures with at least one oxyhalide of an element selected from the class consisting of sulfur and phosphorous in the presence of a selective solvent under conditions to form an extract phase and a raffinate phase containing a treated oil, the oxyhalide being employed in an amount between 0.005 and 0.2% by weight based on gas oil and the amount of oxyhalide being correlated with the amount of nitrogen in the gas oil so that between about 0.05 and 0.5 gram mol of oxyhalide are used per gram atom of nitrogen in the gas oil, recovering said treated oil from the raffinate phase and contacting said treated oil with a solid type catalytic cracking catalyst under conditions to effect catalytic cracking of said treated oil.

3. The process of claim 2 wherein said oxyhalide is sulfuryl chloride.

4. The process of claim 2 wherein the selective solvent is employed in amounts and under conditions to produce an extract phase containing precipitates of the organic nitrogen compounds and containing a minimum amount of gas oil in the extract phase.

5. The process of claim 2 wherein said selective solvent is liquid $SO_2$.

6. The process of claim 2 wherein the gas oil is selected from the group of gas oils consisting of virgin gas oil and gas oil derived from the thermal cracking of petroleum.

7. A catalytic cracking process employing a gas oil charging stock containing organic nitrogen compounds deleterious to the catalytic cracking of said gas oil which process comprises contacting said gas oil with between about 20 to 50 volume percent of liquid $SO_2$ containing from about 0.005 to 0.2% by weight of sulfuryl chloride based on said gas oil, effecting the contacting at a temperature between about $-10$ to $25°$ C. and under sufficient pressure to maintain the $SO_2$ in the liquid phase, stratifying the mixture resulting from said contacting into an extract phase containing precipitates of the nitrogen compounds and a raffinate phase containing a treated oil, recovering said treated oil from the raffinate phase and washing it with aqueous caustic solution to remove residual amounts of $SO_2$ and sulfuryl chloride dissolved in said treated oil, and then contacting the caustic washed oil with a silica-alumina cracking catalyst under conditions to effect catalytic cracking thereof.

References Cited in the file of this patent

UNITED STATES PATENTS

| | | |
|---|---|---|
| 1,661,565 | Edeleanu | Mar. 6, 1928 |
| 2,035,102 | Stratford et al. | Mar. 24, 1936 |
| 2,135,922 | Terres et al. | Nov. 8, 1938 |
| 2,671,046 | Arnold et al. | Mar. 2, 1954 |